US011640173B2

(12) United States Patent
Yasui et al.

(10) Patent No.: US 11,640,173 B2
(45) Date of Patent: May 2, 2023

(54) CONTROL APPARATUS, CONTROL METHOD, AND COMPUTER-READABLE STORAGE MEDIUM STORING PROGRAM

(71) Applicant: HONDA MOTOR CO., LTD., Tokyo (JP)

(72) Inventors: Yuji Yasui, Wako (JP); Hideki Matsunaga, Wako (JP); Ichiro Baba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 17/198,546

(22) Filed: Mar. 11, 2021

(65) Prior Publication Data
US 2021/0294338 A1    Sep. 23, 2021

(30) Foreign Application Priority Data

Mar. 19, 2020    (JP) .............................. JP2020-049398

(51) Int. Cl.
*G05D 1/02*    (2020.01)
*B60W 30/09*   (2012.01)
*G06V 20/58*   (2022.01)
*G05B 13/04*   (2006.01)

(52) U.S. Cl.
CPC ........... *G05D 1/0214* (2013.01); *B60W 30/09* (2013.01); *G05D 1/0246* (2013.01); *G06V 20/58* (2022.01); *B60W 2420/42* (2013.01); *B60W 2554/802* (2020.02); *G05B 13/048* (2013.01)

(58) Field of Classification Search
CPC ... G05D 1/0214; G05D 1/0246; B60W 30/09; B60W 2420/42; B60W 2554/802; G06V 20/58; G05B 13/048
See application file for complete search history.

(56) References Cited

U.S. PATENT DOCUMENTS

| | | | |
|---|---|---|---|
| 10,829,123 B2 * | 11/2020 | You .................... | B60W 40/06 |
| 2014/0330479 A1 * | 11/2014 | Dolgov ................ | G01S 13/865 |
| | | | 701/28 |
| 2017/0291603 A1 * | 10/2017 | Nakamura .......... | B60W 30/095 |
| 2018/0178783 A1 * | 6/2018 | Saiki ................. | B60W 30/0956 |
| 2019/0026572 A1 * | 1/2019 | Theodosis ........... | G06V 20/586 |
| 2020/0247401 A1 * | 8/2020 | Yao ...................... | G01S 17/89 |

(Continued)

FOREIGN PATENT DOCUMENTS

JP    2019-26208 A    2/2019

*Primary Examiner* — Hunter B Lonsberry
*Assistant Examiner* — Harrison Heflin
(74) *Attorney, Agent, or Firm* — Thomas | Horstemeyer, LLP

(57) ABSTRACT

A control apparatus plans a movement route of a moving body based on a recognition result of an exterior environment of the moving body; corrects the planned movement route, based on a recognition result of an obstacle in the exterior environment of the moving body; and controls the movement of the moving body based on the corrected movement route. The recognition result of the obstacle includes a recognition result of a side portion of the obstacle with respect to the movement route of the moving body, and in the correction, the planned movement route is corrected based on a correction amount continuously obtained based on the recognition result of the obstacle associated with advancement of the moving body.

16 Claims, 14 Drawing Sheets

(56) References Cited

U.S. PATENT DOCUMENTS

| | | | |
|---|---|---|---|
| 2021/0078173 A1* | 3/2021 | Zhou | B25J 9/163 |
| 2021/0131823 A1* | 5/2021 | Giorgio | G01S 17/931 |
| 2021/0188356 A1* | 6/2021 | Goto | B62D 6/00 |

* cited by examiner

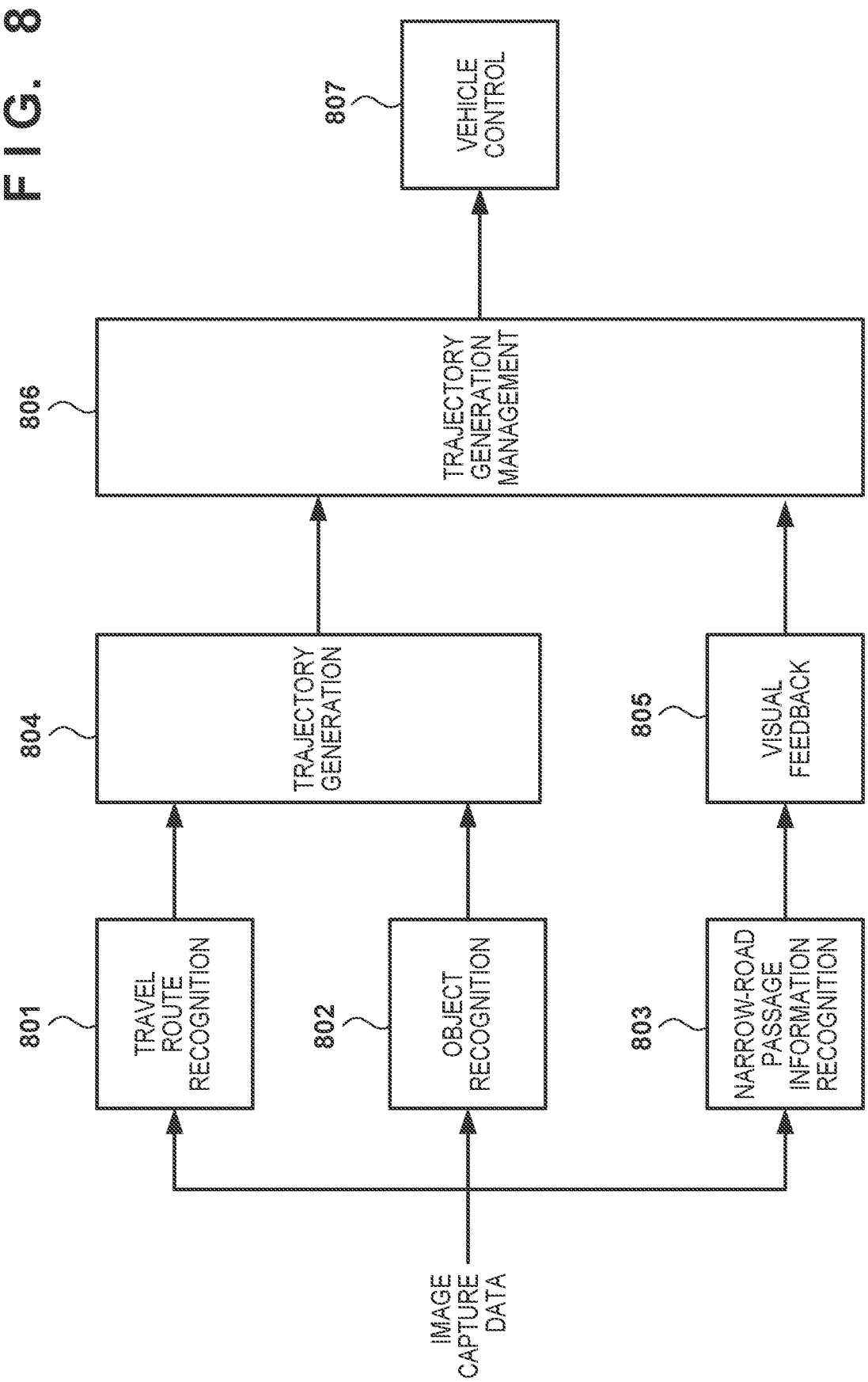

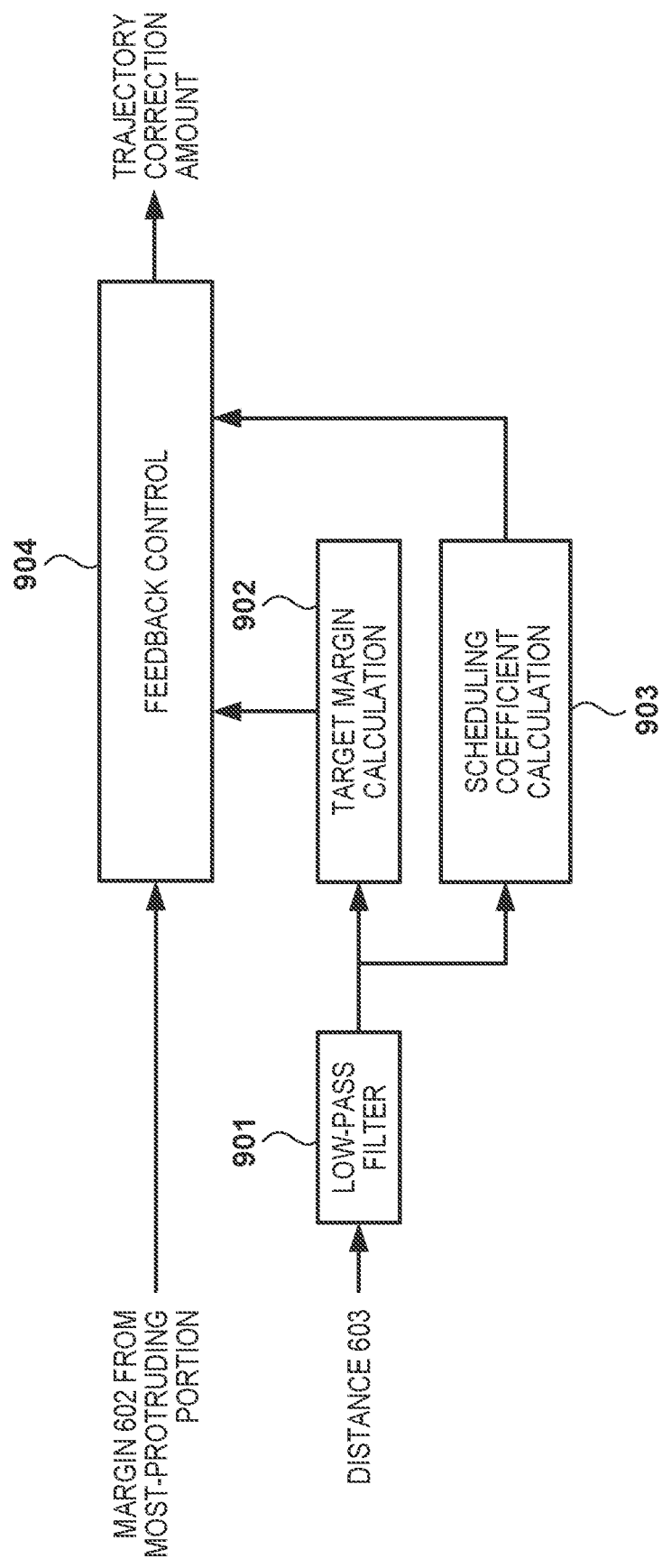

CONTROL APPARATUS, CONTROL METHOD, AND COMPUTER-READABLE STORAGE MEDIUM STORING PROGRAM

CROSS-REFERENCE TO RELATED APPLICATION(S)

This application claims priority to and the benefit of Japanese Patent Application No. 2020-049398 filed on Mar. 19, 2020, the entire disclosure of which is incorporated herein by reference.

BACKGROUND OF THE INVENTION

Field of the Invention

The present invention relates to a control apparatus for controlling travel of a moving body, a control method, and a computer-readable storage medium storing a program.

Description of the Related Art

Japanese Patent Laid-Open No. 2019-26208 discloses that, when passing through a narrow road, a needed surplus width on the driver's seat side with respect to the street and a needed surplus width on the passenger seat side are set with consideration given to a sense of vehicle width on a driver's seat side and a passenger seat side of an automobile and pressure received from a three-dimensional object that is being approached, a target vehicle speed at which both needed surplus widths can be obtained is set, and a target advancement route is set.

There is demand for a mechanism for travel control that enables higher-accuracy positioning of a moving body with respect to an obstacle when passing through a narrow road.

SUMMARY OF THE INVENTION

The present invention provides a control apparatus that enables higher-accuracy positioning of a moving body with respect to an obstacle, a control method, and a computer-readable storage medium storing a program.

The present invention in its first aspect provides a travel control method to be executed by a control apparatus for controlling movement of a moving body, the method comprising: planning a movement route of a moving body based on a recognition result of an exterior environment of the moving body; correcting the planned movement route based on a recognition result of an obstacle in the exterior environment of the moving body; and controlling the movement of the moving body based on the corrected movement route, wherein the recognition result of the obstacle includes a recognition result of a side portion of the obstacle with respect to the movement route of the moving body, and in the correction, the planned movement route is corrected based on a correction amount continuously obtained based on the recognition result of the obstacle associated with advancement of the moving body.

The present invention in its second aspect provides a control apparatus for controlling movement of a moving body, comprising: a movement planning unit configured to plan a movement route of a moving body based on a result of recognizing an exterior environment of the moving body; a correction unit configured to correct the movement route planned by the movement planning unit, based on a result of recognizing an obstacle in the exterior environment of the moving body; and a movement control unit configured to control movement of the moving body based on the movement route corrected by the correction unit, wherein the recognition result of the obstacle includes a recognition result of a side portion of the obstacle with respect to the movement route of the moving body, and the correction unit corrects the movement route planned by the movement planning unit, based on a correction amount obtained continuously based on the recognition result of the obstacle associated with advancement of the moving body.

The present invention in its third aspect provides a computer-readable storage medium storing a program for causing a computer to execute: planning a movement route of a moving body based on a result of recognizing an exterior environment of the moving body; correcting the planned movement route based on a recognition result of an obstacle in the exterior environment of the moving body; and controlling movement of the moving body based on the corrected movement route, in which the recognition result of the obstacle includes a recognition result of a side portion of the obstacle with respect to the movement route of the moving body, and in the correction of the movement route, the planned movement route is corrected based on a correction amount obtained continuously based on the recognition result of the obstacle associated with advancement of the moving body.

According to the present invention, it is possible to enable higher-accuracy positioning of a moving body with respect to an obstacle.

BRIEF DESCRIPTION OF THE DRAWINGS

FIG. 8 is a functional block diagram for illustrating operations of a control unit.

FIG. 9 is a block diagram for illustrating calculation of a trajectory correction amount.

DESCRIPTION OF THE EMBODIMENTS

Figure 1:
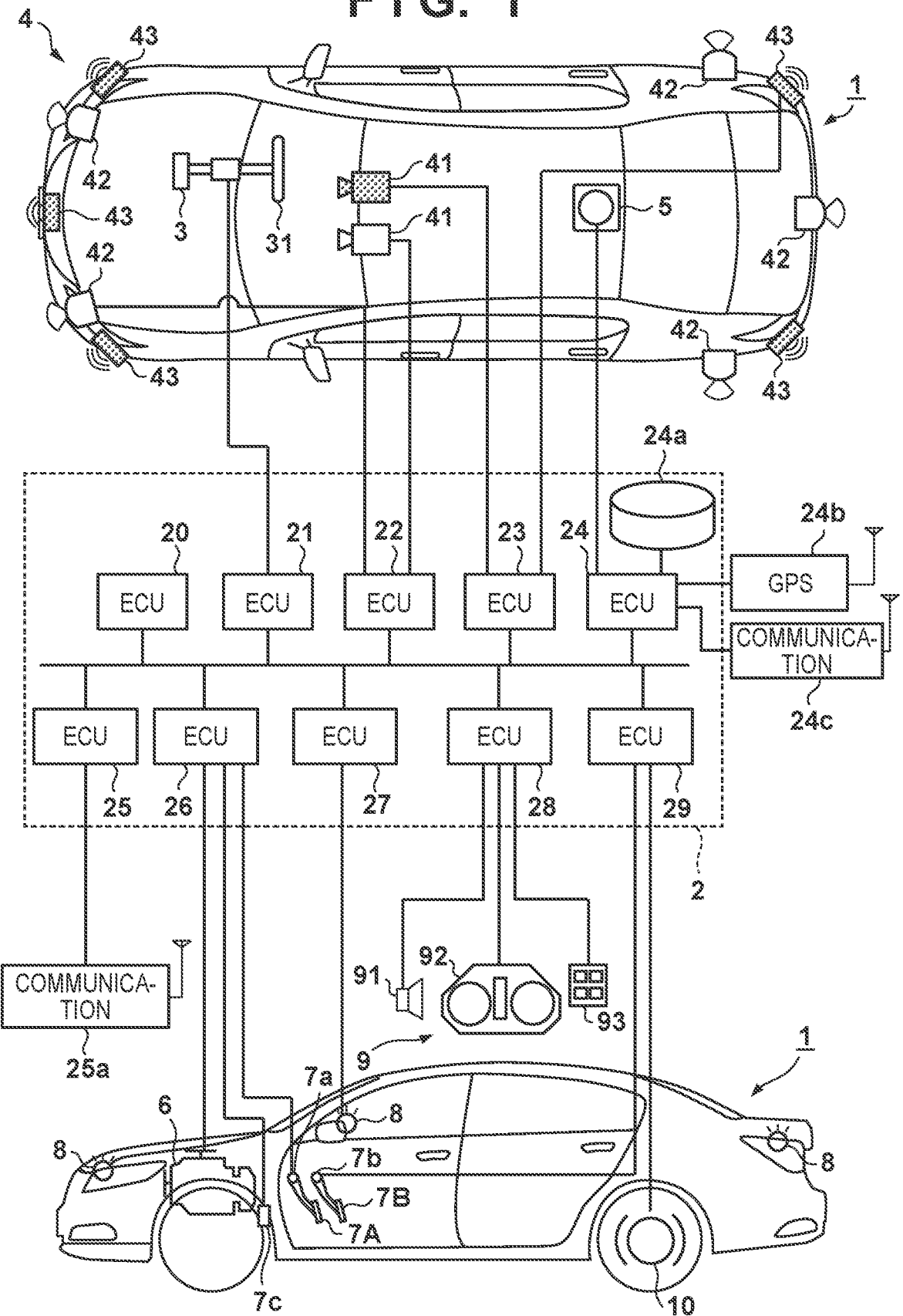
FIG. 1 is a diagram showing a configuration of a vehicle control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle control apparatus (travel control apparatus) according to an embodiment of the present invention, the vehicle control apparatus controlling a vehicle 1. FIG. 1 shows an overview of the vehicle 1 in a plan view and a side view. The vehicle 1 is, for example, a sedan-type four-wheel passenger vehicle.

The control apparatus of FIG. 1 includes a control unit 2. The control unit 2 includes multiple ECUs 20 to 29 that are communicably connected through an intra-vehicle network. Each ECU includes a processor represented by a CPU, a storage device such as a semiconductor memory, an interface with an external device, and the like. Programs to be executed by the processor, data to be used by the processor for processing, and the like are stored in the storage device. Each ECU may also include multiple processors, storage devices, interfaces, and the like. Also, the configuration of the control apparatus shown in FIG. 1 may be a computer that implements the present invention according to a program.

Hereinafter, functions and the like executed by the ECUs 20 to 29 will be described. Note that the number of ECUs and the functions executed thereby can be designed as appropriate, and can be further divided or integrated compared to the present embodiment.

The ECU 20 executes control relating to automatic driving of the vehicle 1. In automatic driving, at least one of steering and acceleration/deceleration of the vehicle 1 is controlled automatically. In a later-described control example, both steering and acceleration are controlled automatically.

The ECU 21 controls an electric power steering apparatus 3. The electric power steering apparatus 3 includes a mechanism for steering the front wheels according to a driving operation (steering operation) performed by a driver on a steering wheel 31. Also, the electric power steering apparatus 3 includes a motor that assists a steering operation or exhibits a driving force for automatically steering the front wheels, a sensor for detecting a steering angle, and the like. If the driving state of the vehicle 1 is automatic driving, the ECU 21 automatically controls the electric power steering apparatus 3 in correspondence with an instruction from the ECU 20, and controls the advancement direction of the vehicle 1.

The ECUs 22 and 23 perform control of detection units 41 to 43 for detecting the state of the surrounding area of the vehicle and information processing of the detection results. The detection unit 41 is a camera that performs image capture in a frontward direction of the vehicle 1 (hereinafter written as "camera 41" in some cases), and in the case of the present embodiment, the detection unit 41 is attached on the vehicle interior side of a front window at the front portion of the roof of the vehicle 1. An outline of a target can be extracted, or a demarcation line (white line, etc.) for a lane on the road can be extracted through analysis of the image captured by the camera 41.

The detection unit 42 is Light Detection and Ranging (LIDAR), detects a target in the surrounding area of the vehicle 1, and measures the distance to the target. In the case of the present embodiment, five detection units 42 are provided, one detection unit 42 being provided at each corner of the front portion of the vehicle 1, one being provided in the center of the rear portion, and one being provided on each side of the rear portion. The detection unit 43 is a millimeter-wave radar (hereinafter written as "radar 43" in some cases), and the detection unit 43 detects a target in the surrounding area of the vehicle 1 and measures a distance to the target. In the case of the present embodiment, five radars 43 are provided, one being provided in the center of the front portion of the vehicle 1, one being provided at each corner of the front portion, and one being provided at each corner of the rear portion.

The ECU 22 performs control of one camera 41 and the detection units 42, and performs information processing of the detection results. The ECU 23 performs control of the other camera 41 and the radars 43, and performs information processing of the detection results. By including two sets of apparatuses for detecting the state of the surrounding area of the vehicle, it is possible to improve the reliability of the detection results, and by including different types of detection units such as cameras and radars, it is possible to perform multi-faceted analysis of the surrounding environment of the vehicle.

The ECU 24 performs control of a gyrosensor 5, a GPS sensor 24b, and a communication apparatus 24c, and information processing of the detection results or communication results. The gyrosensor 5 detects rotational movement of the vehicle 1. The path of the vehicle 1 can be determined using the detection results of the gyrosensor 5, wheel speed, and the like. The GPS sensor 24b detects the current position of the vehicle 1. The communication apparatus 24c acquires map information, traffic information, and weather information by performing wireless communication with a server that provides these pieces of information. The ECU 24 can access a database 24a of map information constructed in a storage device, and the ECU 24 performs route searching and the like from a current location to a target location. Note that databases for the above-described traffic information, weather information, and the like may also be constructed in the database 24a.

The ECU 25 includes a communication apparatus 25a for inter-vehicle communication. The communication apparatus 25a performs wireless communication with another vehicle in the surrounding area, and information exchange is performed between the vehicles.

The ECU 26 controls a power plant 6. The power plant 6 is a mechanism that outputs a driving force for rotating the driving wheels of the vehicle 1, and for example, includes an engine and a transmission. For example, the ECU 26 controls the output of the engine in correspondence with a driving operation (accelerator operation or acceleration operation) performed by the driver, which is detected by an operation detection sensor 7a provided in an accelerator pedal 7A, and switches the gear ratio of the transmission based on information such as the vehicle speed detected by a vehicle speed sensor 7c. If the driving state of the vehicle 1 is automatic driving, the ECU 26 automatically controls the power plant 6 in correspondence with an instruction from the ECU 20, and controls the acceleration/deceleration of the vehicle 1.

The ECU 27 controls lighting devices (headlights, tail lights, etc.) including direction indicators 8 (blinkers). In the case of the example shown in FIG. 1, the direction indicators 8 are provided on the front portion, the door mirrors, and the rear portion of the vehicle 1.

The ECU 28 performs control of an input/output apparatus 9. The input/output apparatus 9 performs output of information to the driver, and reception of input of information from the driver. An audio output apparatus 91 reports information through audio to the driver. A display apparatus 92 reports information through display of an image to the driver. For example, the display apparatus 92 is arranged in front of the driver's seat, and forms an instrument panel and the like. Note that here, although audio and display have been shown as examples, information may also be reported using vibration or light. Information may also be reported using a combination of any of audio, display, vibration, and light. Furthermore, the combination may be changed or the reporting mode may be changed according to the level (e.g., urgency level) of the information to be reported. Also, the display apparatus 92 includes a navigation apparatus.

Although an input apparatus 93 is a group of switches that are arranged at a position at which they can be operated by the driver, and perform instructions to the vehicle 1, they may also include an audio input apparatus.

The ECU 29 controls a brake apparatus 10 and a parking brake (not shown). The brake apparatus 10 is, for example, a disc brake apparatus, is provided on the wheels of the vehicle 1, and decelerates or stops the vehicle 1 by adding resistance to the rotation of the wheels. For example, the ECU 29 controls the operation of the brake apparatus 10 in correspondence with a driving operation (brake operation) performed by the driver, which is detected by an operation detection sensor 7b provided in a brake pedal 7B. If the driving state of the vehicle 1 is automatic driving, the ECU 29 automatically controls the brake apparatus 10 and controls the deceleration and stopping of the vehicle 1 in correspondence with an instruction from the ECU 20. The brake apparatus 10 and the parking brake can operate in order to maintain the stopped state of the vehicle 1. Also, if the transmission of the power plant 6 includes a parking lock mechanism, this can also operate in order to maintain the stopped state of the vehicle 1.

Control relating to the automatic driving of the vehicle 1 executed by the ECU 20 will be described next. When the target location and automatic driving are instructed by the driver, the ECU 20 automatically controls the driving of the vehicle 1 toward the target location in accordance with a guidance route found by the ECU 24. During automatic control, the ECU 20 acquires information (exterior environment information) relating to the state of the surrounding area of the vehicle 1 from the ECUs 22 and 23, and controls the steering and acceleration/deceleration of the vehicle 1 by instructing the ECUs 21, 26, and 29 based on the acquired information.

Figure 2:
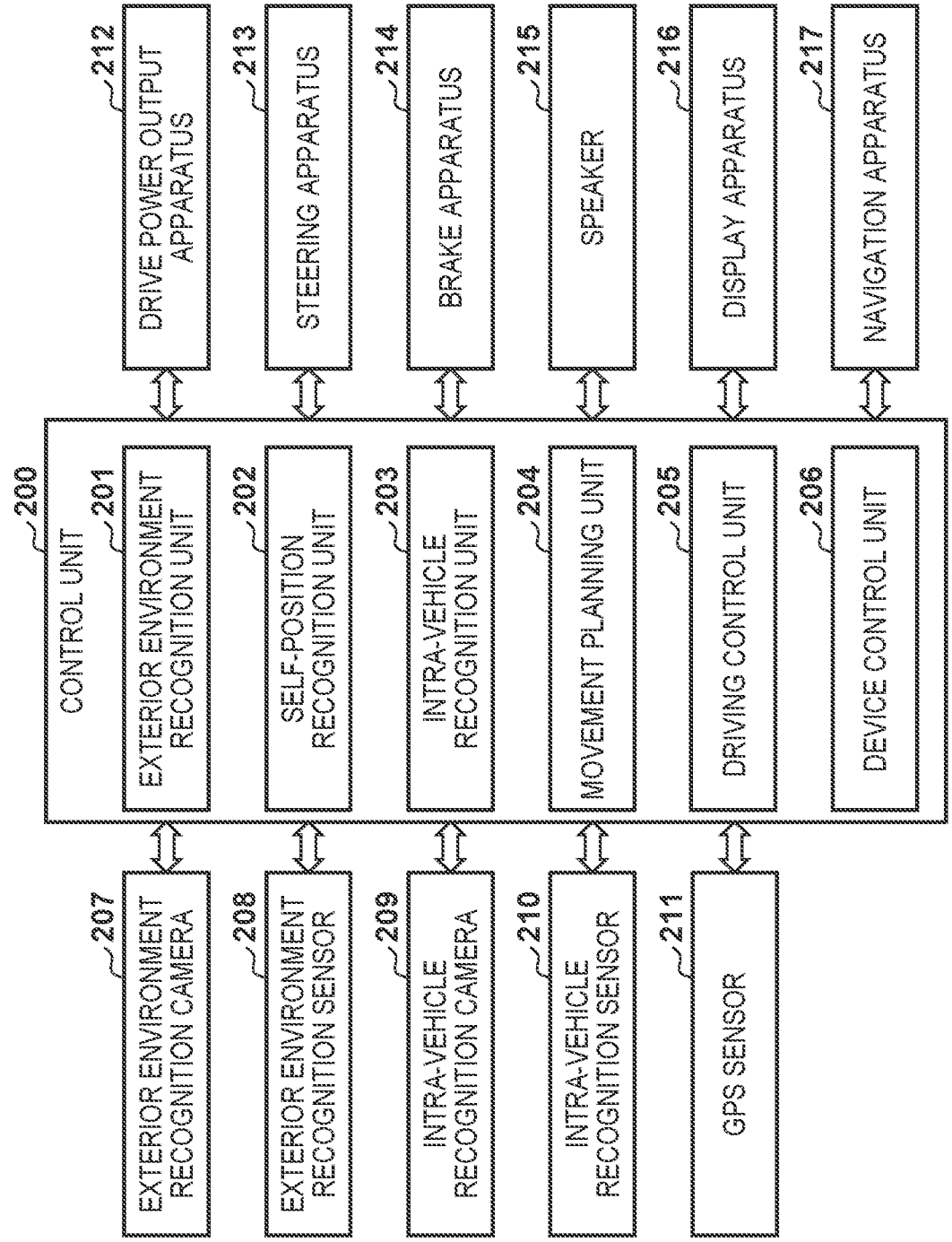
FIG. 2 is a diagram showing functional blocks of a control unit.

FIG. 2 is a diagram showing functional blocks of the control unit 2. The control unit 200 corresponds to the control unit 2 of FIG. 1, and includes an exterior environment recognition unit 201, a self-position recognition unit 202, an intra-vehicle recognition unit 203, a movement planning unit 204, a driving control unit 205, and a device control unit 206. The blocks are realized by one ECU or multiple ECUs shown in FIG. 1.

The exterior environment recognition unit 201 recognizes exterior environment information of the vehicle 1 based on signals from an exterior environment recognition camera 207 and an exterior environment recognition sensor 208. Here, the exterior environment recognition camera 207 is, for example, the camera 41 shown in FIG. 1, and the exterior environment recognition sensor 208 is, for example, the detection units 42 and 43 shown in FIG. 1. The external environment recognition unit 201 recognizes, for example, scenes such as intersections, crossroads, and tunnels, free spaces such as road shoulders, and behavior of other vehicles (speed and advancement direction) based on signals from the exterior environment recognition camera 207 and the exterior environment recognition sensors 208. The self-position recognition unit 202 recognizes the current position of the vehicle 1 based on a signal from a GPS sensor 211. Here, the GPS sensor 211 corresponds to, for example, the GPS sensor 24b shown in FIG. 1.

The intra-vehicle recognition unit 203 recognizes a passenger of the vehicle 1 and recognizes the state of the passenger based on signals from an intra-vehicle recognition camera 209 and an intra-vehicle recognition sensor 210. The intra-vehicle recognition camera 209 is, for example, a near-infrared camera installed on the display apparatus 92 in the vehicle 1, and for example, detects the direction of the line of sight of the passenger. Also, the intra-vehicle recognition sensor 210 is, for example, a sensor that recognizes a biological signal of the passenger. The intra-vehicle recognition unit 203 recognizes that the passenger is in a falling-asleep state, a state of performing an operation other than driving, and the like.

The movement planning unit 204 executes travel planning for planning the travel route of the vehicle 1, such as an optimal route or a risk-avoidance route, based on the result of recognition performed by the exterior environment recognition unit 201 and the self-position recognition unit 202. For example, the movement planning unit 204 performs advancement determination based on start points and end points such as intersections and crossroads, and movement planning based on behavior prediction of other vehicles. The driving control unit 205 controls a drive power output apparatus 212, a steering apparatus 213, and a brake apparatus 214 based on the movement planning performed by the movement planning unit 204. Here, the drive power output apparatus 212 corresponds to, for example, the power plant 6 shown in FIG. 1, the steering apparatus 213 corresponds to the electric power steering apparatus 3 shown in FIG. 1, and the brake apparatus 214 corresponds to the brake apparatus 10.

The device control unit 206 controls devices connected to the control unit 200. For example, the device control unit 206 controls a speaker 215 and outputs a predetermined audio message, such as a message for warning or navigation. Also, for example, the device control unit 206 controls the display apparatus 216 and displays a predetermined interface screen. The display apparatus 216 corresponds to, for example, the display apparatus 92. Also, for example, the device control unit 206 controls the navigation apparatus 217 and acquires setting information set in the navigation apparatus 217.

The control unit 200 may also include functional blocks other than those shown in FIG. 2 as appropriate, and for example, may also include an optimal route calculation unit that calculates an optimal route to a target location based on the map information acquired via the communication apparatus 24c. The control unit 200 may also acquire information from an apparatus other than the cameras and sensors shown in FIG. 2, and for example, may also acquire information of another vehicle via the communication apparatus 25a. Also, the control unit 200 receives detection information not only from the GPS sensor 211 but also from various sensors provided in the vehicle 1. For example, the control unit 200 acquires the detection information of an opening/closing sensor of a door or a mechanical sensor of a door lock provided in a door portion of the vehicle 1, via an ECU included in the door portion. This makes it possible for the control unit 200 to detect unlocking of the door and an opening/closing operation of the door.

Figure 3A:
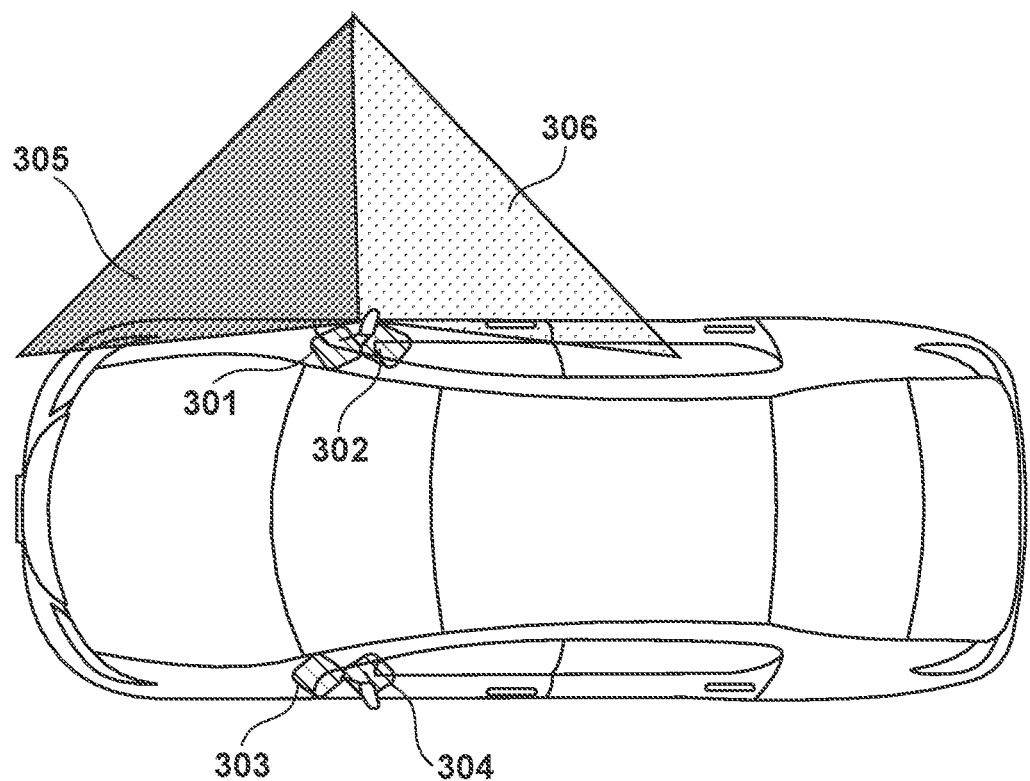
FIGS. 3A and 3B are diagrams showing cameras provided in a vehicle.
Figure 3B:
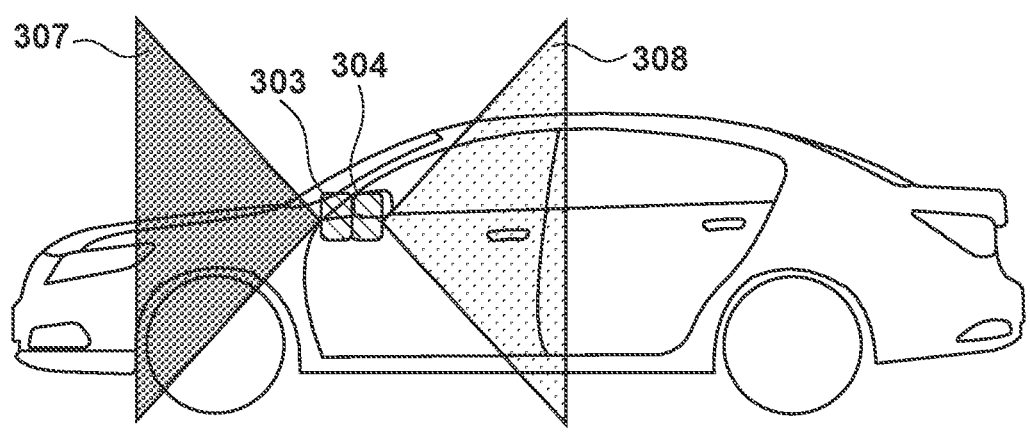

The vehicle 1 is provided with cameras that capture images in the lateral front directions and lateral rear directions of the vehicle 1, in addition to the cameras 41 shown in FIG. 1, as the exterior environment recognition cameras 207. FIGS. 3A and 3B are diagrams showing the installation positions of the cameras, and cameras 301, 302, 303, and 304 are provided near side mirrors. The camera 301 can capture an image in the right-frontward direction of the vehicle 1, and the camera 302 can capture an image in the right-rearward direction of the vehicle 1. Also, the camera 303 can capture an image in the left-frontward direction of the vehicle 1 and the camera 304 can capture an image of the right-frontward direction of the vehicle 1. An image capture region 305 indicates an image capture region of the camera 301, and an image capture region 306 indicates an image capture region of the camera 302. In FIG. 3A, only image capture regions for the cameras 301 and 302 are shown, but image capture regions 305 and 306 are present with left-right symmetry for the cameras 303 and 304 as well. Also, an image capture region 307 indicates an image capture region of the camera 303 and an image capture region 308 indicates an image capture region of the camera 304. In FIG. 3B, only image capture regions for the cameras 303 and 304 are shown, but the image capture regions 307 and 308 are present with left-right symmetry for the cameras 301 and 302 as well.

Figure 4:
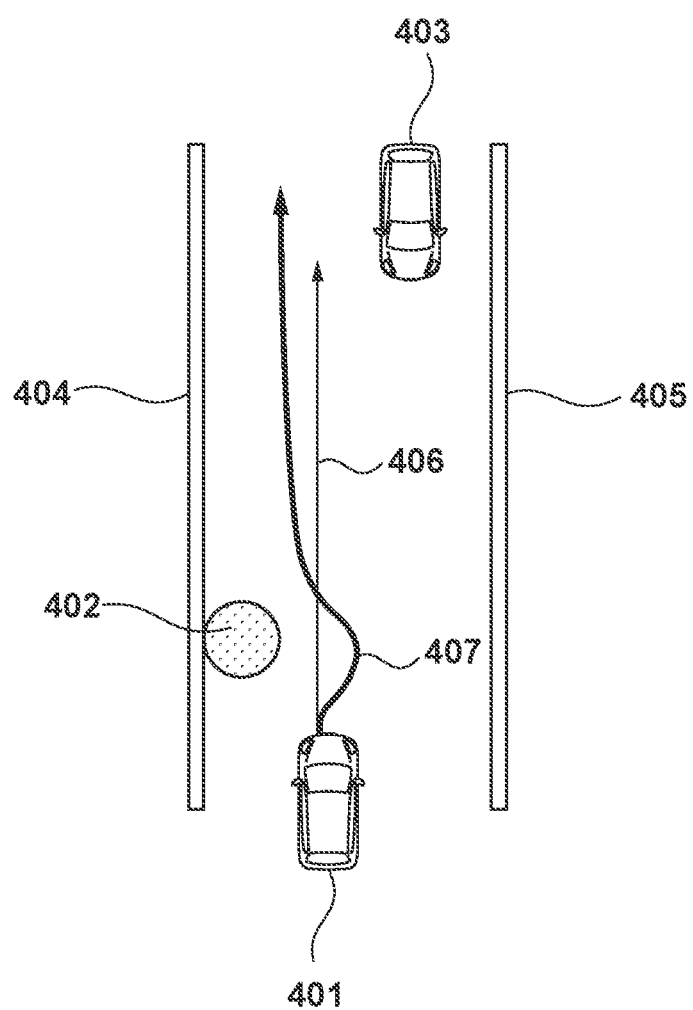
FIG. 4 is a diagram for illustrating narrow-road passage control.

Next, operations of the present embodiment will be described with reference to FIGS. 4 to 7. In the present embodiment, travel control for travelling on a narrow road is performed. FIG. 4 is a diagram showing an example of a scene of passing through a narrow road. In the present embodiment, the vehicle 401 travels on, for example, a narrow road sandwiched on both sides by walls 404 and 405. An obstacle 402 and another vehicle 403 are present on the narrow road. The obstacle 402 is an object or a structure that hampers the advancement of the vehicle when the vehicle advances, and is, for example, a telephone pole or a wall. Although the vehicle 401 attempts to pass the obstacle 402 by a trajectory 406, there are cases in which the shape of details of the obstacle 402 become clearer as the vehicle 401 approaches the obstacle 402, and avoidance thereof becomes more necessary. For example, if a telephone pole has projections such as foothold bolts, it is possible that it will be difficult to recognize the projections when located away from the obstacle 402 and it will be judged that the vehicle 401 can sufficiently pass the obstacle 402 along the trajectory 406 at that time. In such a case, if the vehicle 401 travels along the trajectory 406, there is a possibility that a side surface (e.g., a mirror) of the vehicle 401 will come into contact with the projection. In view of this, in the present embodiment, the trajectory 406 is corrected to a trajectory 407 so as to avoid the obstacle 402, based on the shape of the details (e.g., projections) of the obstacle that are recognized by the exterior environment recognition camera 207 as the obstacle 402 is approached. That is, in the present embodiment, the correction of the trajectory of the vehicle 401 is performed using image recognition results obtained by the exterior environment recognition camera 207, and the vehicle 401 is controlled so as to travel on the corrected trajectory 407. With this kind of configuration, it is possible to enable travel control with more accurate positioning when traveling on a narrow road.

Figure 5:
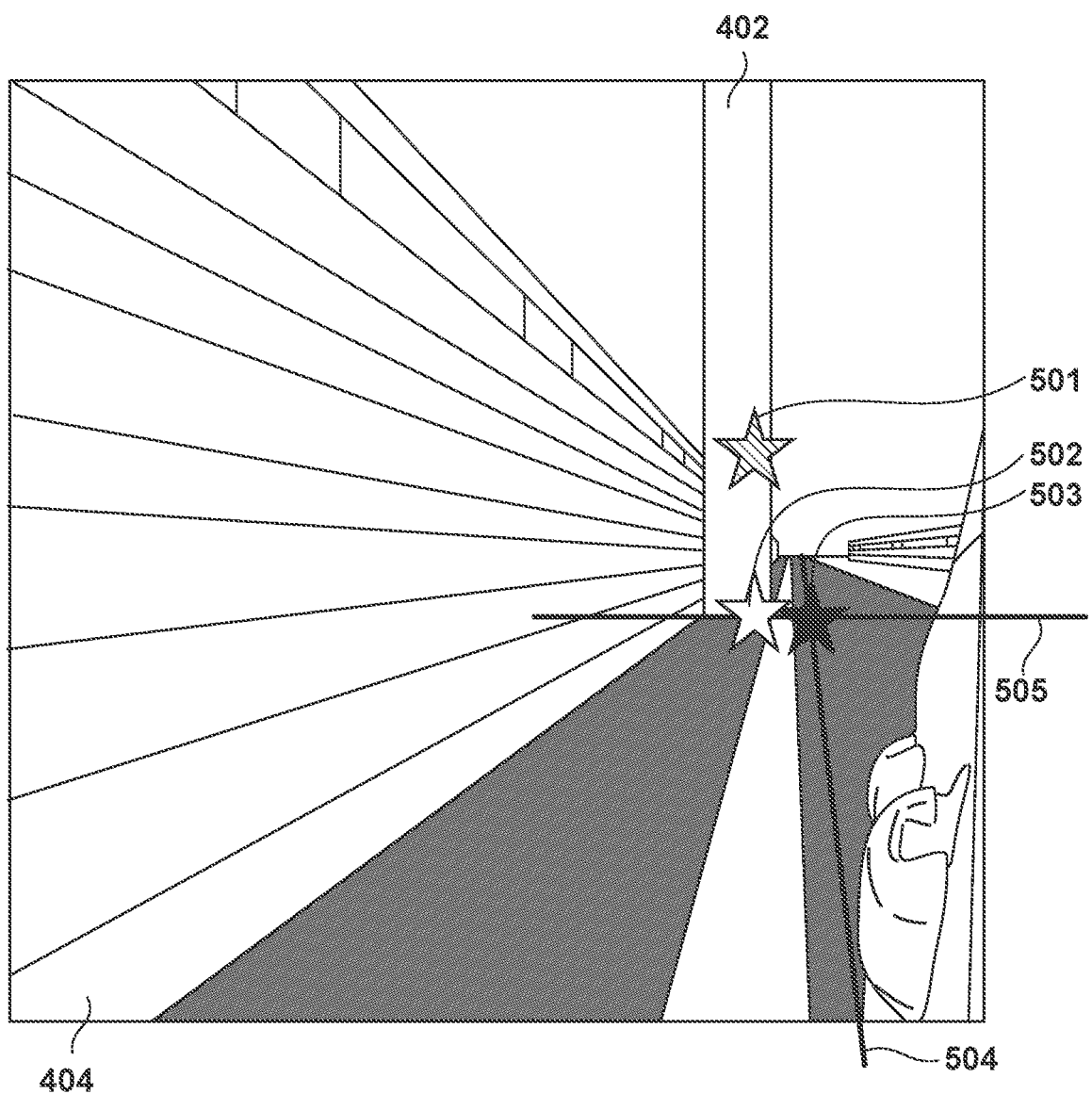
FIG. 5 is a diagram for illustrating narrow-road passage control.
Figure 6:
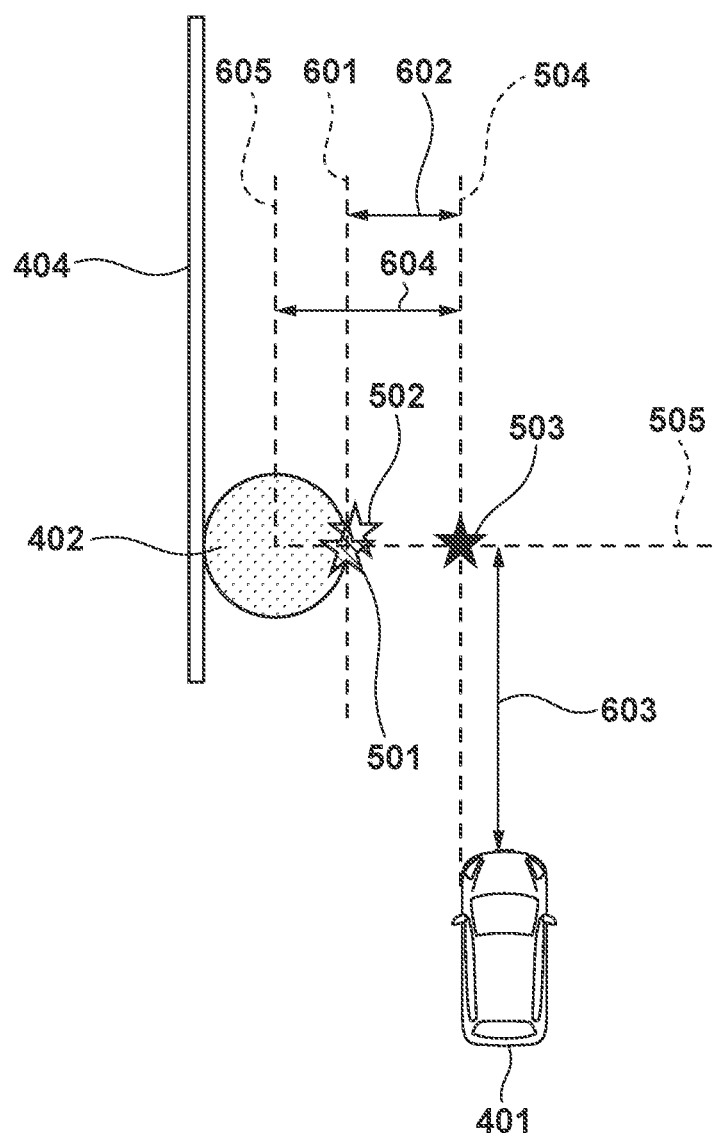
FIG. 6 is a diagram for illustrating narrow-road passage control.

FIG. 5 is a diagram showing an example of an image captured by the camera 303 of the vehicle 401. In the present embodiment, the following portions to be described with reference to FIGS. 5 and 6 are detected based on the image captured by the camera 303. A most-protruding portion 501 shown in FIG. 5 indicates the position of a projection of the obstacle 402. An on-road position 502 shown in FIG. 5 indicates a position on the road in the vertical direction of the most-protruding portion 501.

Figure 13:
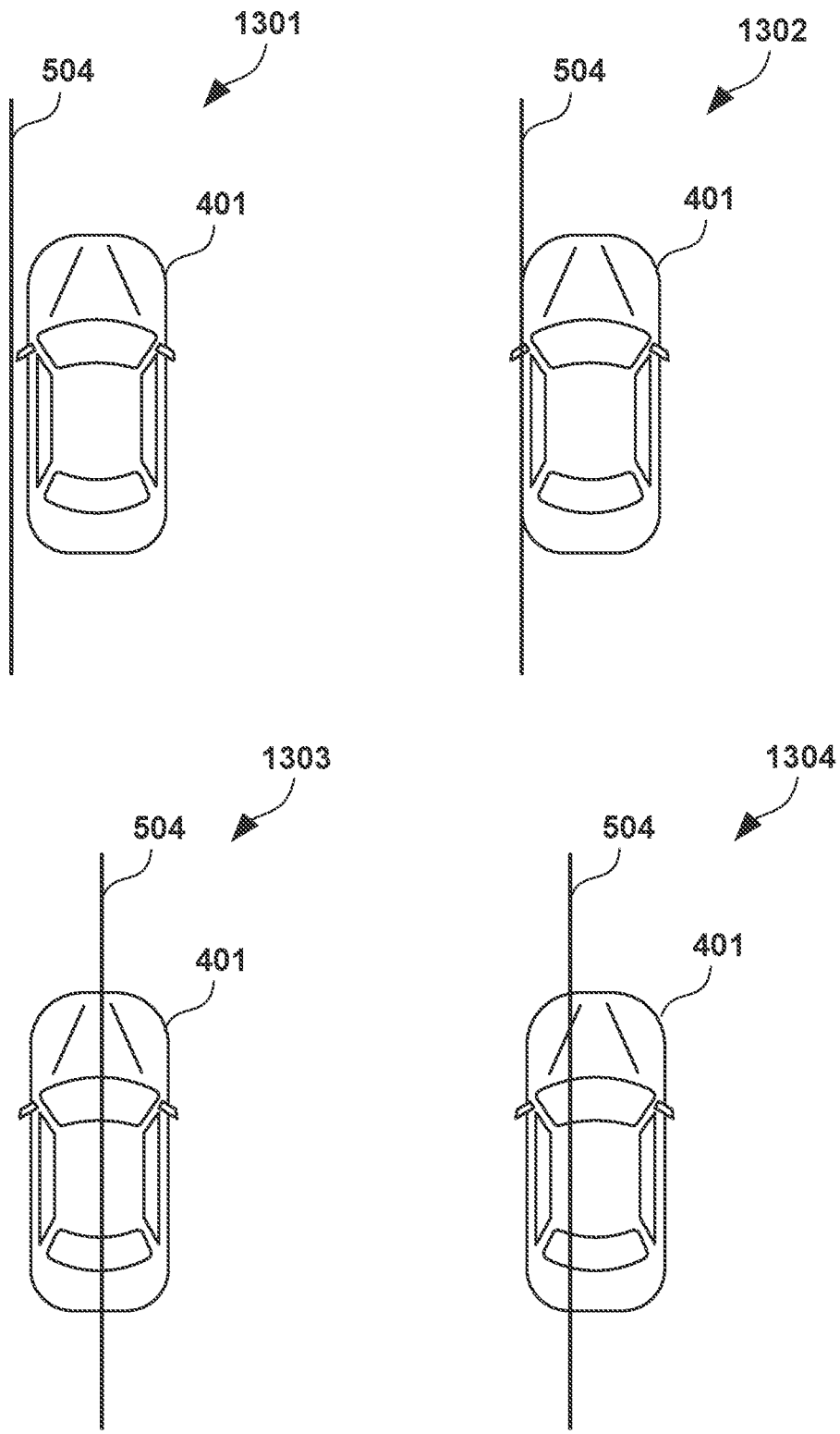
FIG. 13 is a diagram for illustrating a virtual line.

FIG. 6 is a view from above of a scene indicated by the captured image shown in FIG. 5. In FIG. 6, the most-protruding portion 501 and the on-road position 502 are slightly shifted in the drawing. An extended line 504 is a virtual line drawn in the vehicle width direction and the vertical direction so as to pass through the side surface of the vehicle 401, the outer end of the door mirror, the center, or the like. FIG. 13 is a diagram showing an example of the virtual line 504. Reference numeral 1301 in FIG. 13 indicates a virtual line 504 rendered so as to pass through the outer end of the door mirror. Also, reference numeral 1302 in FIG. 13 indicates a virtual line 504 drawn so as to pass through a side surface of the vehicle 401. Also, reference numeral 1303 in FIG. 13 indicates a virtual line 504 rendered so as to pass through the center of the vehicle 401. Also, reference numeral 1304 in FIG. 13 indicates a virtual line 504 drawn so as to pass through a given position in the vehicle width direction of the vehicle 401. Also, a virtual line 505 is a virtual line in the width direction of the narrow road from the on-road position 502. An on-extended-line position 503 is an intersection point between the extended line 504 and the virtual line 505. A distance 603 is a distance from the vehicle 401 to the virtual line 505. A virtual line 601 is a virtual line in a narrow road direction that passes through the most-protruding portion 501. A margin 602 from the most-protruding portion is an interval (margin) that is to be ensured between the virtual line 601 and the extended line 504. The virtual line 605 is a virtual line in the narrow road direction that passes through the center of gravity of the obstacle 402. The center of gravity is, for example, the center in a cross section, and may also be acquired based on a bounding box of an object obtained from a captured image. A target margin 604 is an interval between the virtual line 605 and the extended line 504. The virtual lines may also be specified on a captured image, and may also be specified based on the map information or the like.

Figure 7:
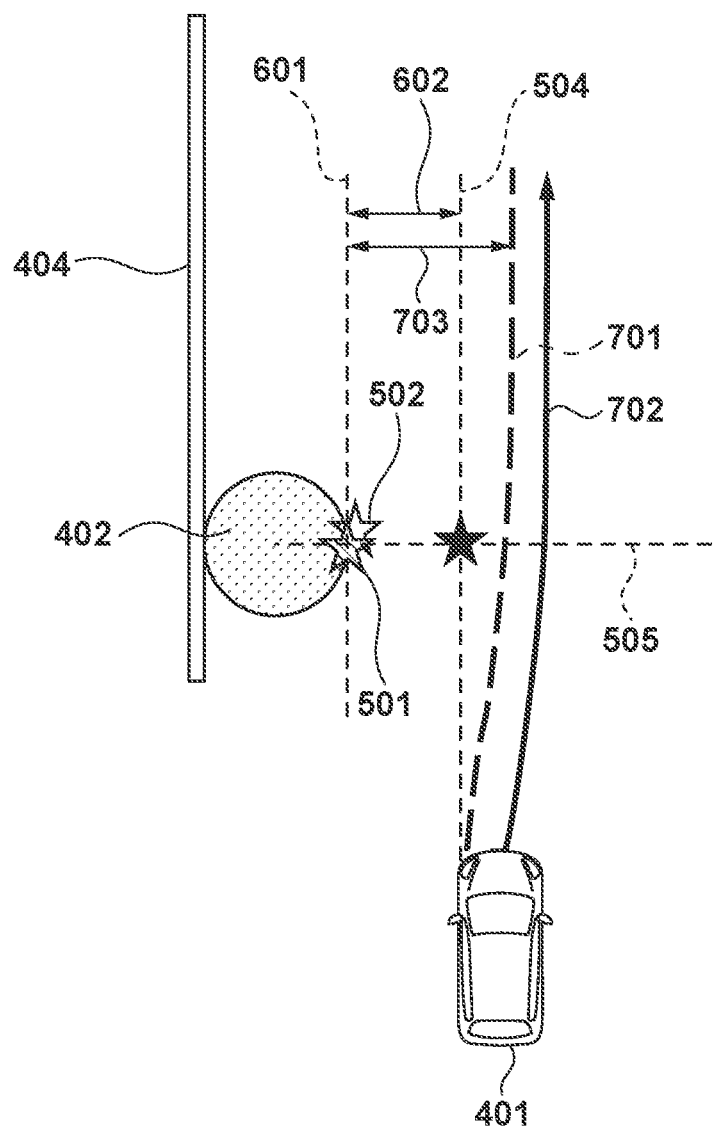
FIG. 7 is a diagram for illustrating narrow-road passage control.

FIG. 7 is a diagram showing a corrected trajectory of the vehicle 401. If the vehicle 401 advances straight as-is, the vehicle 401 will travel along the extended line 504. In the present embodiment, the target margin 604 is acquired based on the above-described portions acquired from the image captured by the exterior environment recognition camera 207. Then, the trajectory of the vehicle 401 is corrected such that the vehicle 401 travels with the target margin 604 ensured with respect to the obstacle 402. A margin 703 is an interval resulting from performing later-described feedback control on the margin 602 from the most-protruding portion. That is, the margin 703 is ensured as the interval corresponding to the target margin 604. A trajectory 702 indicates the corrected trajectory, and a path 701 indicates the path of the side surface of the vehicle 401.

FIG. 8 is a functional block diagram for illustrating operations of the control unit 200 for realizing the present embodiment. The control unit 200 acquires the captured image data (image capture result). Here, the image capture data is, for example, image capture data obtained by the exterior environment recognition camera 207 performing image capture. The control unit 200 performs travel route recognition 801, object recognition 802, and narrow-road passage information recognition 803 based on the acquired image capture data. In the travel route recognition 801, recognition of the road environment such as a white line, obstacles on the road, and the like are performed. Also, in the object recognition 802, recognition of a traffic participant, which is a moving body such as a vehicle or a pedestrian, or the like is performed. Also, in the narrow-road passage information recognition 803, the portions shown in FIGS. 5 and 6 are detected. For example, in the narrow-road passage information recognition 803, the most-protruding portion 501, the on-road position 502, the on-extended-line position 503, the extended line 504, the virtual lines 505, 601, and 605, the distance 603, the margin 602 from the most protruding portion, and the target margin 604 are detected. The travel route recognition 801, the object recognition 802, and the narrow-road passage information recognition 803 may also be realized by, for example, the exterior environment recognition unit 201 of the control unit 200.

The recognition results of the travel route recognition 801 and the object recognition 802 are output to trajectory generation 804. In the trajectory generation 804, the travel trajectory of the vehicle 1 is generated based on the recognition results in the travel route recognition 801 and the recognition results in the object recognition 802. For example, the travel trajectory generated in the trajectory generation 804 is generated through model prediction control performed based on a risk potential, based on the result of recognizing the walls 404 and 405, the obstacle 402, and the other vehicle 403 shown in FIG. 4. At this time, the obstacle 402 is acquired from, for example, a bounding box determined through image recognition based on the image capture data.

When the bounding box is determined through clip processing for extracting an overall rectangular shape, it is possible that detailed shapes such as projections will be excluded from recognition. If an attempt is made to pass through a narrow road using a travel trajectory generated based on this kind of recognition result, for example, there is a possibility that a side mirror of the vehicle will come into contact with the projection of the telephone pole. In view of this, in the present embodiment, in visual feedback 805, a correction amount of the trajectory generated in the trajectory generation 804 is acquired using a pixel count based on the recognition result of the narrow-road passage information recognition 803. According to such a configuration, it is possible to realize travel control using accurate positioning on a narrow road with consideration given to a projection or the like on the surface of the obstacle 402. Also, by using the image capture data of the camera, it is possible to more accurately recognize the projection and to realize higher-accuracy travel control as the obstacle 402 is approached.

The travel trajectory generated in the trajectory generation 804 and the trajectory correction amount acquired in the visual feedback 805 are output to trajectory generation management 806. In the trajectory generation management 806, the travel trajectory generated in the trajectory generation 804 is corrected based on the trajectory correction amount acquired in the visual feedback 805. Note that the trajectory generation 804, the visual feedback 805, and the trajectory generation management 806 are realized by, for example, the movement planning unit 204 of the control unit 200. The information relating to the travel trajectory corrected in the trajectory generation management 806 is output to vehicle control 807. The vehicle control 807 is realized by the drive control unit 205 of the control unit 200, and the drive power output apparatus 212, the steering apparatus 213, and the brake apparatus 214 are controlled based on the information relating to the travel trajectory.

Figure 12:
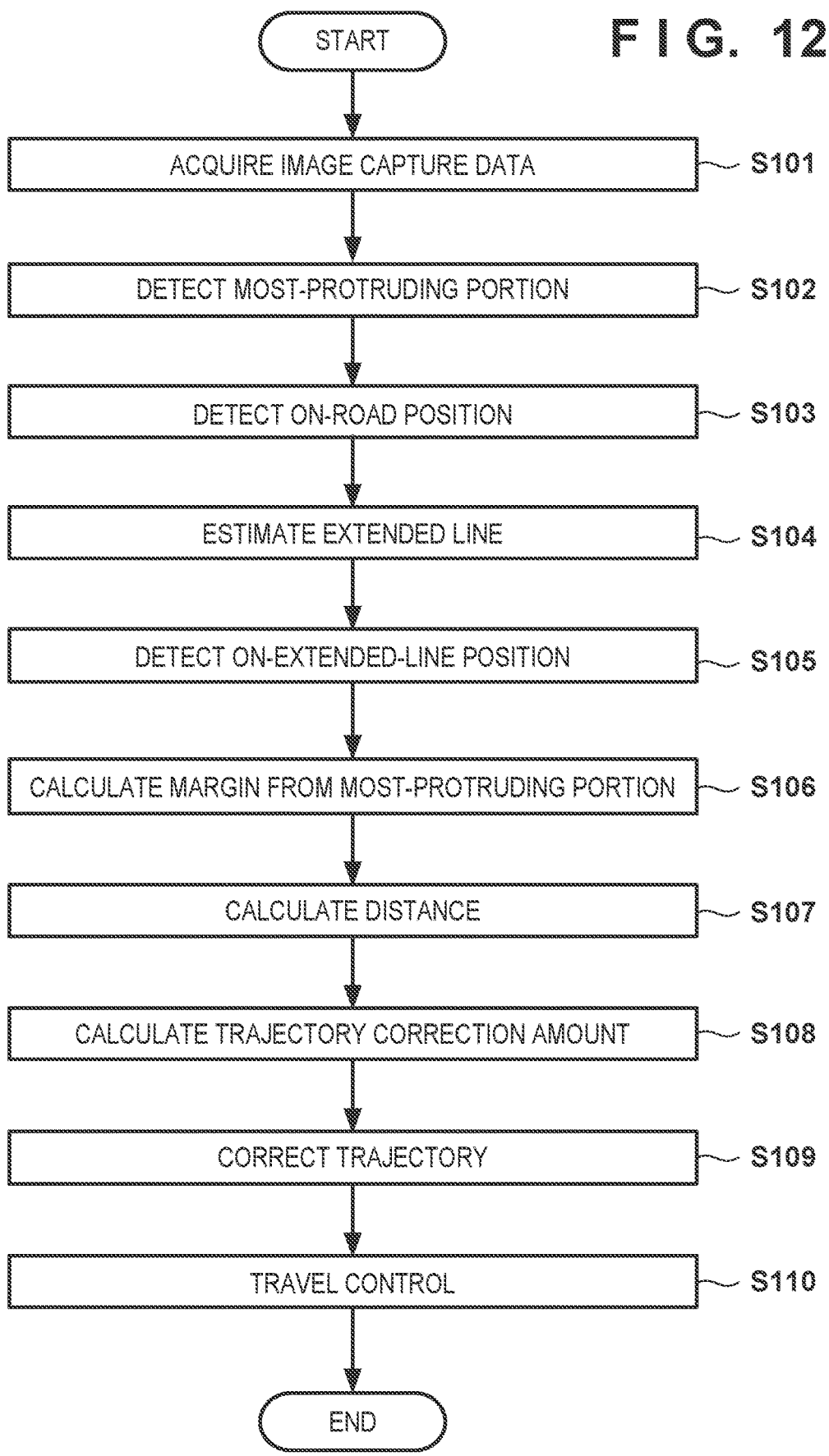
FIG. 12 is a flowchart showing processing for narrow-road passage control.

FIG. 12 is a flowchart showing processing for travel control executed by the control unit 200. The processing of FIG. 12 is realized by, for example, the processor of the control unit 200 reading out and executing a program stored in the storage region. Also, the processing of FIG. 12 is started when generation of a travel trajectory through the trajectory generation 804 is started during a specific scene, such as passing through a narrow road sandwiched on both sides by walls, as shown in FIG. 4. During the travel of the vehicle, the processing of FIG. 12 is repeatedly executed in parallel with the generation of the travel trajectory (e.g., the horizontal position and vehicle speed of the vehicle 401) through the trajectory generation 804. Then, the travel trajectory generated accompanying the travel of the vehicle is continuously subjected to feedback correction based on the correction amount.

In step S101, the control unit 200 acquires the image capture data. The image capture data in this context is image capture data of the exterior environment recognition camera 207, and for example, is the image capture data of the camera 303 for capturing an image in the left-frontward direction of the vehicle 1, as shown in FIG. 5.

The processing of step S102 and onward corresponds to the processing for the narrow-road passage information recognition 803, the visual feedback 805, the trajectory generation management 806, and the vehicle control 807 of FIG. 8. Note that the processing of the travel route recognition 801, the object recognition 802, and the trajectory generation 804 is executed in parallel with the processing of step S102 and onward to generate the travel trajectory of the vehicle 1.

Figure 14:
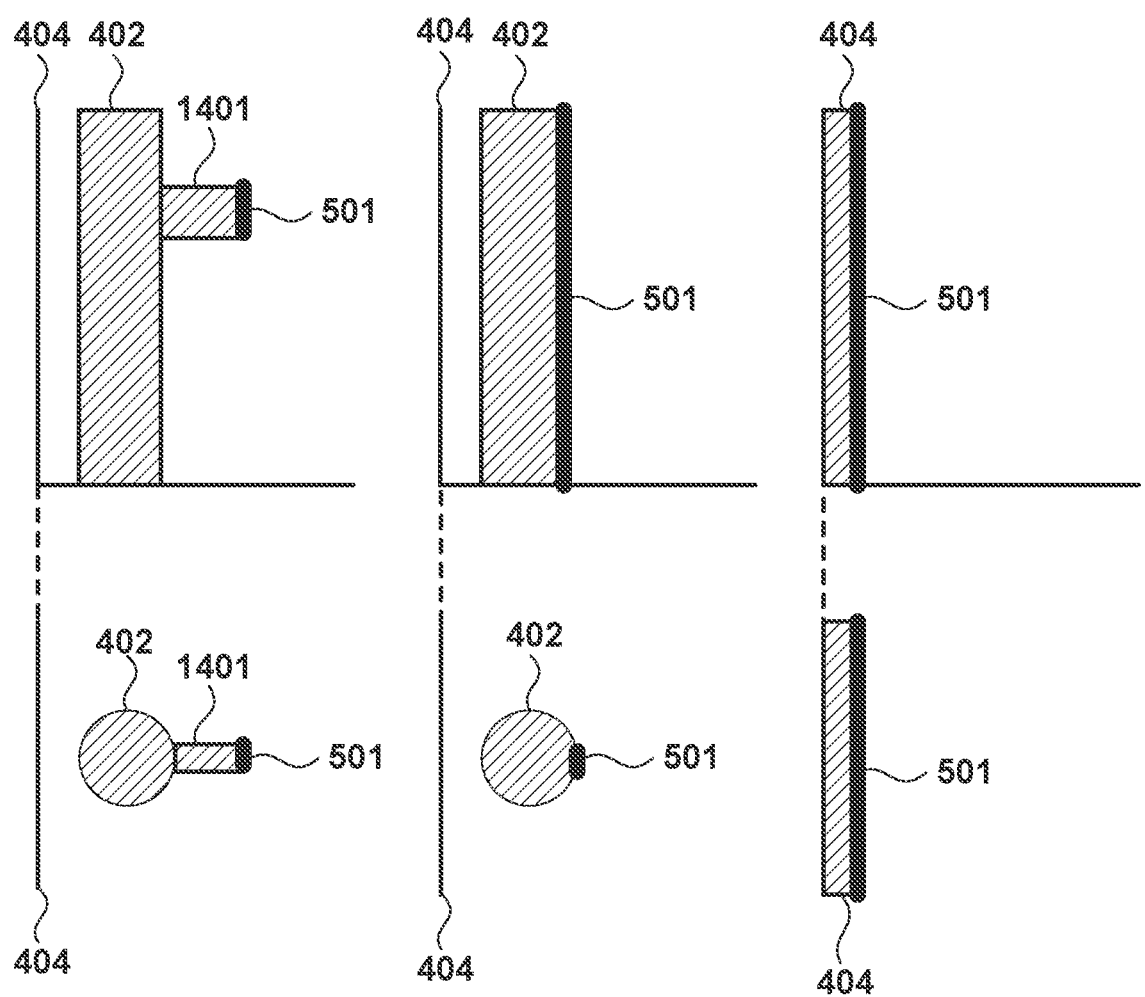
FIG. 14 is a diagram for illustrating a most-protruding portion.

The processing of steps S102 to S107 is executed as the narrow-road passage information recognition 803. In step S102, the control unit 200 detects the most-protruding portion 501 based on the image capture data acquired in step S101. In the present embodiment, the most-protruding portion 501 includes a side portion of the portion protruding toward the travel route of the vehicle 1 or the side surface portion on the travel route side of the vehicle 1. FIG. 14 is a diagram for illustrating the most-protruding portion 501. The left column of FIG. 14 shows a state in which a telephone pole serving as the obstacle 402 is installed near the wall 404 and a foothold bolt 1401 protrudes from the telephone pole toward the travel route of the vehicle 1. Also, the central column of FIG. 14 shows a state in which the telephone pole serving as the obstacle 402 is installed near the wall 404. However, in the central column, the foothold bolt 1401 is not installed. Also, the right column of FIG. 14 shows a state in which only the wall 404 is present and there is no telephone pole serving as the obstacle 402. The right column of FIG. 14 shows an example in which the wall 404 is the obstacle 402. The upper row of FIG. 14 is a view from the side, and the lower row is a view from above. In the left column of FIG. 14, the most-protruding portion 501 is the side portion of the foothold bolt 1401. In the central column of FIG. 14, the most-protruding portion 501 is the side surface portion of the telephone pole serving as the obstacle 402. In the right column of FIG. 14, the most-protruding portion 501 is the side surface portion of the wall 404 serving as the obstacle 402.

In step S102, during the detection of the most-protruding portion 501, it is also possible to determine whether or not the most-protruding portion 501 has been detected, based on the processing result in the trajectory generation 804. For example, if the obstacle 402 is far away, it is judged that there is no difference between the bounding box generated in the trajectory generation 804 and an image recognition result such as segmentation in the narrow-road passage information recognition 803 in some cases. In this case, it may be determined that no most-protruding portion 501 has been detected, and the processing of step S102 and onward may not be performed. On the other hand, in some cases, the projection becomes clear in the image as the obstacle 402 is approached, and as a result, it is judged that there is a difference between the bounding box generated in the trajectory generation 804 and the image recognition result in the narrow-road passage information recognition 803. In this case, it may be judged that correction of the travel trajectory is necessary, and the most-protruding portion 501 may be detected based on the image capture data acquired in step S101, and the processing thereafter may also be performed.

In step S103, the control unit 200 estimates a virtual line extending from the most-protruding portion 501 on the vertical line, and detects an intersection point with the road surface as the on-road position 502. In step S104, the control unit 200 estimates a virtual line 504 obtained by extending the side surface of the vehicle 1 in the advancement direction of the vehicle 1 along the narrow road. In step S105, the control unit 200 detects the intersection point between the extended line 504 and the virtual line 505 as the on-extended-line position 503. In step S106, the control unit 200 calculates the margin 602 from the most-protruding portion. In the present embodiment, the control unit 200 acquires a pixel count between the on-road position 502 and the on-extended-line position 503 on the virtual line 505 and uses the pixel count as the margin 602 from the most-protruding portion. In step S107, the control unit 200 acquires the distance 603 from the vehicle 401 to the virtual line 505. Note that the distance 603 may also be acquired using, for example, meters as the units instead of a pixel count.

The acquisition results shown in steps S102 to S107 in the narrow-road passage information recognition 803, for example, the margin 602 from the most-protruding portion and the distance 603, are output to the visual feedback 805. The processing of step S108 is executed as the visual feedback 805.

In step S108, the control unit 200 calculates the trajectory correction amount based on the margin 602 from the most-protruding portion and the distance 603.

FIG. 9 is a block diagram for illustrating calculation of a trajectory correction amount in the visual feedback 805. The visual feedback 805 includes blocks for a low-pass filter 901, target margin calculation 902, scheduling coefficient calculation 903, and feedback control 904.

After a high-frequency component is removed using the low-pass filter 901, the distance 603 is output to the target margin calculation 902 and the scheduling coefficient calculation 903. The influence of vibration, pitching, rolling, and the like of the vehicle 1 is removed by the low-pass filter 901, and as a result, the feedback control can be stabilized.

In the target margin calculation 902, the target margin 604 is calculated. As described above, the target margin 604 is acquired as an interval between the virtual line 605 and the extended line 504. Also, in the present embodiment, the target margin 604 is acquired as a pixel count. For this reason, the target margin 604 is a feature whose value increases as the obstacle 402 is approached.

Figure 10A:
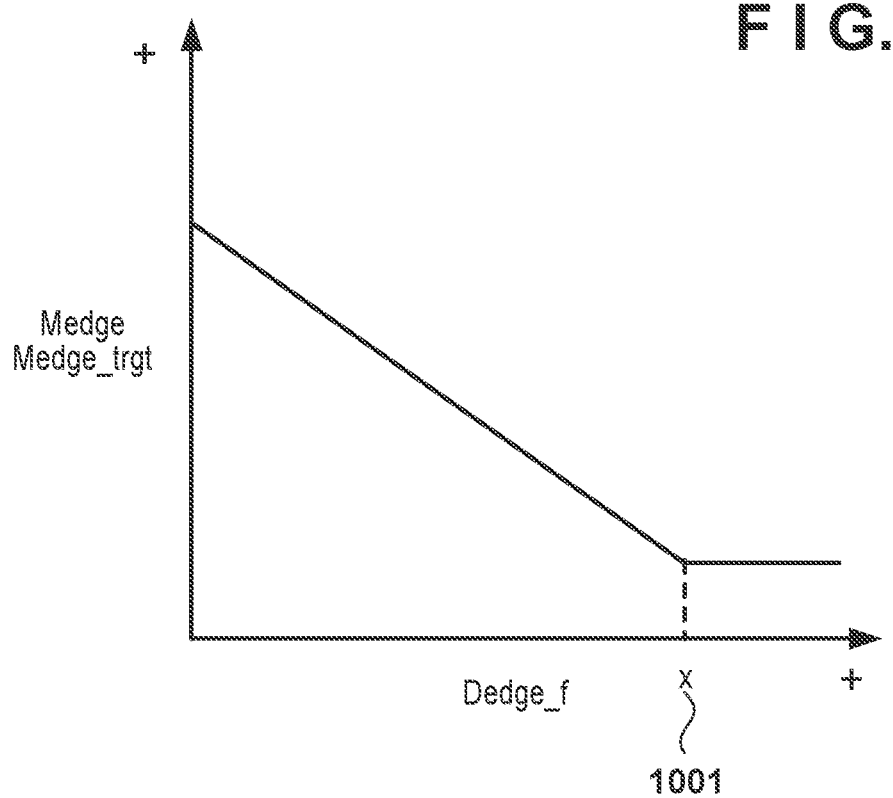
FIGS. 10A and 10B are diagrams showing features of a target margin and a scheduling coefficient.

FIG. 10A is a diagram showing features of the target margin 604. The horizontal axis indicates the distance 603 and the vertical axis indicates the target margin 604. As shown in FIG. 10A, the pixel count indicated by the target margin 604 increases the smaller the distance 603 is, that is, the more the obstacle 402 is approached. Also, since the resolution of the camera is insufficient when the vehicle 401 is a predetermined distance x 1001 or more away from the obstacle 402, the pixel count is set to a constant value.

In the scheduling coefficient calculation 903, a scheduling coefficient is calculated. The scheduling coefficient is a coefficient for optimizing the feedback control in change over time, and for example, is set in a range of 0 to 1 corresponding to the change in the distance 603.

Figure 10B:
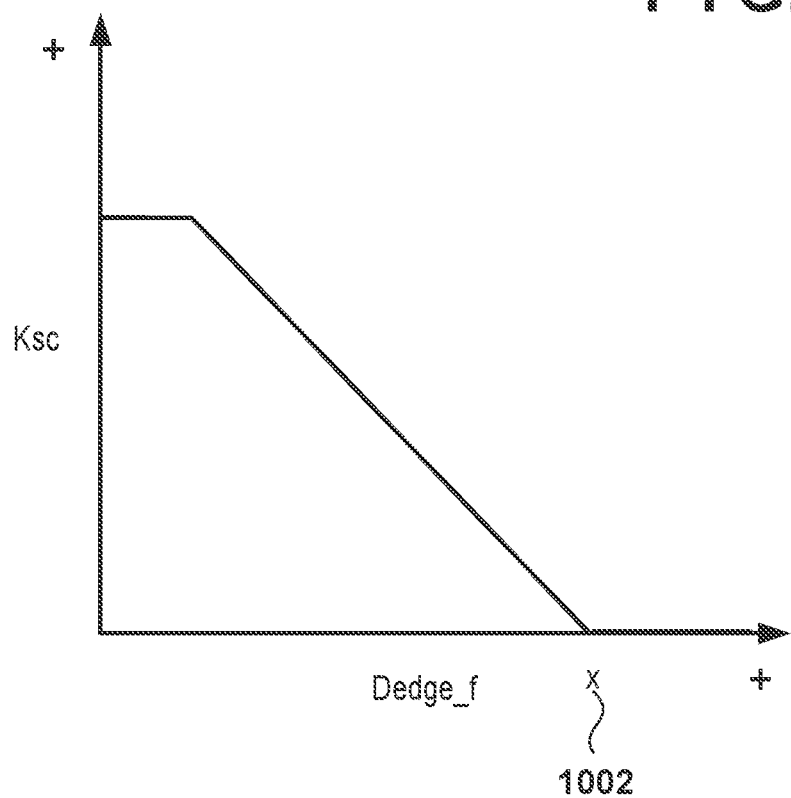

FIG. 10B is a diagram showing features of a scheduling coefficient. The horizontal axis indicates the distance 603, and the vertical axis indicates the scheduling coefficient. As shown in FIG. 10B, the scheduling coefficient increases the smaller the distance 603 is, that is, the more the obstacle 402 is approached, the scheduling coefficient is set so as to be a constant value when the vehicle 401 approaches within a predetermined range. Also, since the resolution of the camera is insufficient when the vehicle 401 is a predetermined distance x1002 or more away from the obstacle 402, the scheduling coefficient is set to zero. In the scheduling coefficient calculation 903, if the vehicle 401 is a predetermined distance x 1002 or more away from the obstacle 402, or if the vehicle 401 has passed through the most-protruding portion 501, the scheduling coefficient is reset to zero.

The target margin 604 calculated in the target calculation 902 and the scheduling coefficient calculated in the scheduling coefficient calculation 903 are output to the feedback control 904.

In the feedback control 904, a margin deviation between the margin 602 from the most-protruding portion and the target margin 604, a proportional feedback gain, and an integrated feedback gain are used in the approach of the vehicle 401 to the obstacle 402, and the feedback control is performed continuously such that the interval from the most-protruding portion 501 of the vehicle 401 is the interval of the target margin 604 calculated in the target margin calculation 902 accompanying the advancement of the vehicle. Note that at this time, the feedback control may also be performed such that an interval greater than or equal to the target margin 604 is reached. Then, the feedback control 904 determines and outputs the trajectory correction amount according to which the interval from the most-protruding portion 501 of the vehicle 401 reaches the interval of the target margin 604. In the present embodiment, the trajectory correction amount is output as a pixel count. Note that in the feedback control 904, if the vehicle 401 is a predetermined distance or more away from the obstacle 402 or if the vehicle 401 has passed the most-protruding portion 501, the scheduling coefficient is reset to zero, and after the elapse of a predetermined amount of time, the trajectory correction amount is reset to zero. As a result of the trajectory correction amount being reset to zero, the vehicle control 807 is performed using the travel trajectory generated in the trajectory generation 804.

Figure 11:
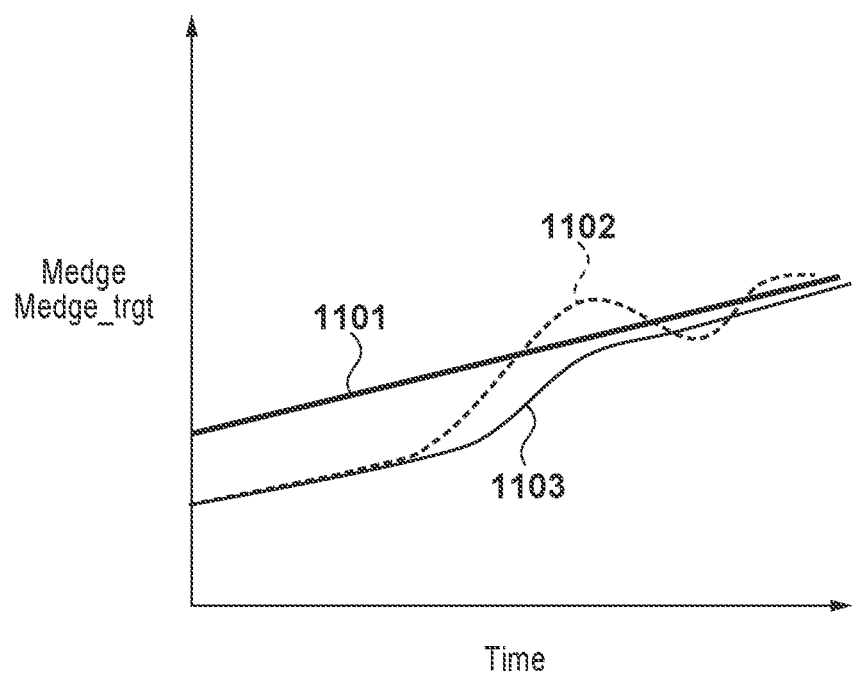
FIG. 11 is a diagram for illustrating a result obtained using a forgetting factor.

Also, in the present embodiment, a forgetting factor is used in the determination of the trajectory correction amount. FIG. 11 is a diagram for illustrating a result obtained using a forgetting factor. Graph 1101 in FIG. 11 indicates a target margin 604. Also, graph 1102 indicates a margin 703 in the case where a forgetting factor is not used, and graph 1103 indicates a margin 703 in the case where a forgetting factor is used. As shown in FIG. 11, if the forgetting factor is used, the graph 1103 changes such that the target margin 1101 is approached, without exceeding the target margin 1101. That is, the trajectory correction amount obtained based on the margin 703 is a change in one direction, and in the case of FIG. 7, the route correction amount is a change in a direction of moving away from the obstacle 402. On the other hand, if overshooting occurs as in the graph 1102, depending on the route correction amount obtained based on the margin 703, there is a possibility that the trajectory correction amount will be a change in a direction of approaching the obstacle 402, and erroneous contact between the vehicle 401 and the most-protruding portion 501 will occur. In the present embodiment, by using the forgetting factor in the determination of the trajectory correction amount, the occurrence of this kind of erroneous contact can be prevented.

After the trajectory correction amount is determined in step S108, in step S109, the control unit 200 corrects the travel trajectory generated in the trajectory generation 804, based on the determined trajectory correction amount. At this time, the trajectory correction amount indicated by the pixel count is converted into a distance parameter. Then, in step S110, the control unit 200 uses the drive control unit 205 to control the drive power output apparatus 212, the steering apparatus 213, and the brake apparatus 214 so as to travel on the travel trajectory corrected in step S109.

In this manner, according to the present embodiment, by using a pixel count obtained based on image capture data of a camera in feedback control, it is possible to more clearly recognize projections and the like on a surface of the obstacle 402 as the obstacle 402 is approached, and it is possible to enable high-accuracy feedback control.

In the present embodiment, as shown in FIGS. 4 to 7, travel control performed with respect to the obstacle 402 in the left-frontward direction of the vehicle 401 was described. However, the operations of the present embodiment can be applied also to an obstacle in the right-frontward direction of the vehicle 401. Also, if there is an obstacle in both the left-frontward direction and the right-frontward direction of the vehicle 401, the following control may also be performed.

For example, the trajectory correction amount acquired in step S108 for the obstacle in the left-frontward direction is set as $dTrj\_fb\_L$, and the trajectory correction amount acquired in step S108 for the obstacle in the right-frontward direction is set as $dTrj\_fb\_R$. Here, if either trajectory correction amount is zero, the addition result $dTrj\_fb$ of the trajectory correction amount is used in step S109. However, the travel trajectory Trj obtained in step S109 is calculated as in formula (1). However, $Trj\_bs$ is the travel trajectory generated through model prediction control in the trajectory generation 804.

If $|dTrj\_fb\_L|=0$ or $|dTrj\_fb\_R|=0$, $$Trj=Trj\_bs+dTrj\_fb=Trj\_bs+dTrj\_fb\_L+dTrj\_fb\_R \quad (1)$$

As shown in the formula above, a case in which correction of the travel trajectory is not needed (correction amount is zero) on one of the right side and the left side is a case in which there is no projection or the like on the obstacle on one of the sides, and in such a case, it is judged that narrow-road passage is possible, and travel control of the present embodiment is performed.

On the other hand, if correction of the travel trajectory on both the right side and the left side is needed (the correction amount is not zero), the travel trajectory Trj obtained in step S109 is calculated as in formula (2).

If $|dTrj\_fb\_L|\neq 0$ and $|dTrj\_fb\_R|\neq 0$, $$Trj=Trj\_bs \text{ and vehicle stops} \quad (2)$$

That is, the travel trajectory $Trj\_bs$ generated through model prediction control in the trajectory generation 804 is set as the travel trajectory Trj, and control is performed so as to stop the vehicle. In a state in which correction of the travel trajectory is needed on both the right side and the left side, that is, a state in which there is an obstacle that needs to be avoided in the opposite direction on both sides, it is judged that narrow road passage is not possible, and control is performed so as to stop the vehicle. In this manner, it is possible to suitably perform travel control according to the trajectory correction amounts for obstacles on both sides of the vehicle.

In the present embodiment, travel control according to which the vehicle 1 travels on a narrow road was described. However, the operations of the present embodiment may also be applied to a moving body other than the vehicle 1. For example, the operations of the present embodiment may also be applied to movement control performed when a drone serving as a moving body flies on a narrow road. In this case, for example, by using a pixel count obtained based on image capture data of a camera mounted on the drone in feedback control, it is possible to more clearly recognize projections and the like on the surface of an obstacle 402 as the drone approaches the obstacle 402, and it is possible to perform highly-accurate feedback control.

Summary of Embodiments

The control apparatus of the above-described embodiment is a control apparatus (200) for controlling movement of a moving body, including: a movement planning unit (204) configured to plan a movement route of a moving body based on a result of recognizing an exterior environment of the moving body; a correction unit (200, 204, 805, 806) configured to correct the movement route planned by the movement planning unit, based on a result of recognizing an obstacle in the exterior environment of the moving body; and a movement control unit (200, 205, 807) configured to control the movement of the moving body based on the movement route corrected by the correction unit, in which the result of recognizing the obstacle includes a result of recognizing a side portion of the obstacle with respect to the movement route of the moving body, and the correction unit corrects the movement route planned by the movement planning unit, based on a correction amount continuously obtained based on the result of recognizing the obstacle accompanying advancement of the moving body. Also, the result of recognizing the obstacle is a result of capturing an image of the obstacle.

With such a configuration, for example, it is possible to enable higher-accuracy positioning of a vehicle with respect to an obstacle based on image capture data of a camera.

Also, the correction amount is acquired based on an interval (602) between the side portion (501) of the obstacle and an extended line (504) in an advancement direction of the moving body extending along the movement route of the moving body. The interval is acquired as a pixel count. Also, the interval is acquired as an interval between a point (502) on a road corresponding to the side portion of the obstacle and the extended line set virtually on the road. The correction amount is acquired based on a margin (703) from the side portion of the obstacle, and the margin is greater than the interval (602). The margin is acquired as a pixel count. Also, the margin increases as the obstacle is approached in the advancement direction of the vehicle.

With such a configuration, for example, it is possible to acquire the parameters for acquiring the correction amount based on the image capture data of the camera, and it is possible to enable highly-accurate positioning of the vehicle in units of pixels.

Also, the correction unit corrects the movement route planned by the movement planning unit, so as to ensure the margin between the moving body and the side portion of the obstacle (FIG. 7).

With such a configuration, for example, it is possible to prevent contact with the protruding portion of the obstacle.

Also, a result of recognizing the obstacle that is newly acquired as the movement control unit controls the movement of the moving body based on the corrected movement route is fed back to the correction unit.

With such a configuration, for example, it is possible to correct the travel route so as to ensure a margin at all times between the vehicle and the obstacle based on the recognition result obtained accompanying the approach of the vehicle to the obstacle.

As a result of the feedback to the correction unit, a forgetting factor is used in the continuous acquisition of the correction amount.

With such a configuration, for example, as a result of correcting the travel route, the vehicle can prevent erroneous contact with the protruding portion of the obstacle.

A distance between the moving body and the obstacle in the advancement direction of the moving body is used in the correction of the movement route performed by the correction unit. The distance is obtained as a value from which a high-frequency component has been removed (901).

With such a configuration, for example, it is possible to use a parameter from which the influence of vibration of the vehicle has been removed in the correction, and it is possible to realize stable feedback control.

Also, if the distance is greater than a predetermined value, the correction unit does not perform the correction of the movement route planned by the movement planning unit.

With such a configuration, for example, it is possible to prevent correction for avoiding the protruding portion of the obstacle from being performed even when the vehicle is far from the obstacle.

Also, the result of recognizing the obstacle includes a result of recognizing an obstacle on a left side and an obstacle on a right side in the advancement direction of the moving body, and if one of a first correction amount obtained based on the obstacle on the left side and a second correction amount obtained based on the obstacle on the right side is zero, the correction unit performs correction of the movement route planned by the movement planning unit. Also, if both the first correction amount and the second correction amount are not zero, the movement control unit performs control so as to stop the moving body.

With such a configuration, it is possible to suitably perform travel control according to the correction amounts for the obstacles on both sides of the vehicle. The invention is not limited to the foregoing embodiments, and various variations/changes are possible within the spirit of the invention.

What is claimed is:

1. A travel control method to be executed by a control apparatus for controlling movement of a moving body, the method comprising:
    planning a movement route of a moving body based on a recognition result of an exterior environment of the moving body;
    correcting the planned movement route based on a recognition result of an obstacle in the exterior environment of the moving body; and
    controlling the movement of the moving body based on the corrected movement route,
    wherein the recognition result of the obstacle includes a recognition result of a side portion of the obstacle with respect to the movement route of the moving body, and
    in the correction, the planned movement route is corrected based on a correction amount continuously obtained based on the recognition result of the obstacle associated with advancement of the moving body;
    wherein the correction amount is acquired based on an interval between the side portion of the obstacle and an extended line in an advancing direction of the moving body; and
    wherein the interval is acquired as an interval between a point on a road corresponding to the side portion of the obstacle and the extended line set virtually on the road.

2. The travel control method according to claim 1, wherein the recognition result of the obstacle is a result of capturing an image of the obstacle.

3. The travel control method according to claim 1, wherein the interval is acquired as a pixel count.

4. The travel control method according to claim 1, wherein the correction amount is acquired based on a margin from the side portion of the obstacle, and the margin is greater than the interval.

5. The travel control method according to claim 4, wherein the margin is acquired as a pixel count.

6. The travel control method according to claim 5, wherein the margin increases as the moving body approaches the obstacle in the advancing direction.

7. The travel control method according to claim 4, wherein the planned movement route is corrected, so as to ensure the margin between the moving body and the side portion of the obstacle.

8. The travel control method according to claim 1, wherein a recognition result of the obstacle that is newly acquired as traveling of the moving body is controlled based on the corrected movement route is fed back to a correction unit for performing the correction.

9. The travel control method according to claim 8, wherein a forgetting factor is used in continuous acquisition of the correction amount obtained from the result of feedback to the correction unit.

10. The travel control method according to claim 1, wherein a distance between the moving body and the obstacle in the advancing direction of the moving body is used in the correction of the movement route.

11. The travel control method according to claim 10, wherein the distance is obtained as a value from which a high-frequency component has been removed.

12. The travel control method according to claim 10, wherein if the distance is greater than a predetermined value, the correction of the planned movement route is not performed.

13. The travel control method according to claim 1,
    wherein the recognition result of the obstacle includes a recognition result of an obstacle on a left side and an obstacle on a right side in the advancing direction of the moving body, and
    if one of a first correction amount obtained based on the obstacle on the left side and a second correction amount obtained based on the obstacle on the right side is zero, the correction of the planned movement route is performed.

14. The travel control method according to claim 13, wherein if both the first correction amount and the second correction amount are not zero, control of the movement of the moving body is performed so as to stop the moving body.

15. A control apparatus for controlling movement of a moving body, comprising:
    a movement planning unit configured to plan a movement route of a moving body based on a result of recognizing an exterior environment of the moving body;

a correction unit configured to correct the movement route planned by the movement planning unit, based on a result of recognizing an obstacle in the exterior environment of the moving body; and a movement control unit configured to control movement of the moving body based on the movement route corrected by the correction unit, wherein the recognition result of the obstacle includes a recognition result of a side portion of the obstacle with respect to the movement route of the moving body, and the correction unit corrects the movement route planned by the movement planning unit, based on a correction amount obtained continuously based on the recognition result of the obstacle associated with advancement of the moving body;

wherein the correction amount is acquired based on an interval between the side portion of the obstacle and an extended line in an advancing direction of the moving body; and wherein the interval is acquired as an interval between a point on a road corresponding to the side portion of the obstacle and the extended line set virtually on the road.

16. A non-transitory computer-readable storage medium storing a program for causing a computer to execute:

planning a movement route of a moving body based on a result of recognizing an exterior environment of the moving body;

correcting the planned movement route based on a recognition result of an obstacle in the exterior environment of the moving body; and controlling movement of the moving body based on the corrected movement route, wherein the recognition result of the obstacle includes a recognition result of a side portion of the obstacle with respect to the movement route of the moving body, and in the correction of the movement route, the planned movement route is corrected based on a correction amount obtained continuously based on the recognition result of the obstacle associated with advancement of the moving body;

wherein the correction amount is acquired based on an interval between the side portion of the obstacle and an extended line in an advancing direction of the moving body; and wherein the interval is acquired as an interval between a point on a road corresponding to the side portion of the obstacle and the extended line set virtually on the road.

* * * * *